US012344080B2

(12) United States Patent
Larsson et al.

(10) Patent No.: US 12,344,080 B2
(45) Date of Patent: Jul. 1, 2025

(54) DOOR SYSTEM AND A METHOD FOR IMPROVING DURABILITY OF A VEHICLE DURING A ROOF CRUSH

(71) Applicants: Ningbo Geely Automobile Research & Development Co., Ltd., Ningbo (CN); Zhejiang Geely Holding Group Co., Ltd., Zhejiang (CN)

(72) Inventors: Martin Larsson, Älvängen (SE); Martin Svensson, Kullavik (SE); Henrik Grammahage, Torslanda (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 273 days.

(21) Appl. No.: 18/074,955

(22) Filed: Dec. 5, 2022

(65) Prior Publication Data
US 2023/0097127 A1 Mar. 30, 2023

Related U.S. Application Data

(63) Continuation of application No. PCT/CN2021/100703, filed on Jun. 17, 2021.

(30) Foreign Application Priority Data

Jun. 30, 2020 (EP) ..................................... 20183038

(51) Int. Cl.
*B60J 5/04* (2006.01)
*B60R 21/00* (2006.01)

(52) U.S. Cl.
CPC ............. *B60J 5/043* (2013.01); *B60J 5/0458* (2013.01); *B60J 5/0479* (2013.01); *B60R 2021/0018* (2013.01)

(58) Field of Classification Search
CPC ... B60J 5/043; B60J 5/0458; B60J 5/04; B60J 5/042; B60J 5/06; B60J 2005/0475;
(Continued)

(56) References Cited

U.S. PATENT DOCUMENTS

| 1,639,037 A | 8/1927 | Hollingshead |
| 5,364,157 A | 11/1994 | Siedlecki |

(Continued)

FOREIGN PATENT DOCUMENTS

| CN | 101270628 A | 9/2008 |
| CN | 202345341 U | 7/2012 |

(Continued)

OTHER PUBLICATIONS

International Search Report from International Application No. PCT/CN2021/100703, mailed Aug. 4, 2021, 3 pages.

*Primary Examiner* — Amy R Weisberg
*Assistant Examiner* — Denise Lynne Esquivel
(74) *Attorney, Agent, or Firm* — Tucker Ellis LLP (57) ABSTRACT

A door system for a vehicle includes a vehicle body structure and a first door structure. The first door structure includes a first door beam extending between a lower part and an upper part of the vehicle body structure when the first door structure is in a closed position. A first bracket is attached to a lower end of the first door beam. The first bracket is arranged to run in a first guide rail arranged in the vehicle body structure. The first guide rail includes a first recession. The first bracket includes a first protrusion arranged at a bottom end of the first bracket. Upon a roof crush, the first protrusion and the first recession in the first guide rail is arranged to engage to prevent separation of the first door structure from the vehicle body structure.

13 Claims, 7 Drawing Sheets

(58) Field of Classification Search
CPC ..... B60J 2005/0479; B60R 2021/0018; B62D 25/02; B62D 25/025; B62D 25/06
USPC ............... 296/146.6, 187.08, 187.12, 187.13
See application file for complete search history.

(56) References Cited

U.S. PATENT DOCUMENTS

| | | | |
|---|---|---|---|
| 6,332,641 | B1 | 12/2001 | Okana |
| 6,749,253 | B1 | 6/2004 | Zummallen |
| 6,926,340 | B2 * | 8/2005 | Moriyama ............... B60J 5/043 |
| | | | 296/146.9 |
| 10,040,339 | B2 * | 8/2018 | Kanagai ..................... B60J 5/06 |
| 2007/0169415 | A1 | 7/2007 | Jain |
| 2012/0049580 | A1 | 3/2012 | Konchan |
| 2012/0319388 | A1 | 12/2012 | Ishii |
| 2015/0368941 | A1 | 12/2015 | Schoch |

FOREIGN PATENT DOCUMENTS

| | | |
|---|---|---|
| CN | 203640550 U | 6/2014 |
| CN | 107031531 A | 8/2017 |
| CN | 111301124 A | 6/2020 |
| DE | 202010003634 U1 | 7/2011 |
| DE | 202017101182 U1 | 4/2017 |
| EP | 1068970 A1 | 1/2001 |
| EP | 1340641 A1 | 9/2003 |
| GB | 2408025 A | 5/2005 |
| JP | 2007161043 A | 6/2007 |
| JP | 2009023573 A | 2/2009 |
| KR | 100804467 B1 | 2/2008 |
| KR | 20190143692 A | 12/2019 |

* cited by examiner

DOOR SYSTEM AND A METHOD FOR IMPROVING DURABILITY OF A VEHICLE DURING A ROOF CRUSH

RELATED APPLICATION DATA

This application is a continuation of International Patent Application No. PCT/CN2021/100703, filed Jun. 17, 2021, which claims the benefit of European Patent Application No. 20183038.7, filed Jun. 30, 2020, the disclosures of which are incorporated herein by reference in their entireties.

TECHNICAL FIELD

The disclosure relates to a method for improving durability of a vehicle during a roof crush and a door system for a vehicle comprising a vehicle body structure and a first door structure. The vehicle body structure comprises an opening to an interior compartment of the vehicle, wherein the door system comprises a displacement mechanism configured for displacing the first door structure in relation to the opening between an open position and a closed position. The first door structure is in the closed position arranged to cover at least a portion of the opening. The first door structure is in the open position arranged at a distance from the closed position in a longitudinal direction of the vehicle body structure. The first door structure comprises an essentially vertically arranged first door beam arranged to extend between a lower part of the vehicle body structure and an upper part of the vehicle body structure when the first door structure is arranged in a closed position.

BACKGROUND

Vehicle doors may be opened in a number of different ways. One technical solution is to provide sliding front and rear doors. To provide an aesthetically pleasing design, this solution results in the removal of the B-pillar that is attached to the vehicle body. As the B-pillar makes up a part of the vehicle's collision protection, the forces normally absorbed by or transferred by the B-pillar during a collision have to be managed in order to fulfill the requirements of e.g. Insurance Institute for Highway Safety (IIHS) and the National Highway Traffic Safety Administration (NHTSA). For instance, Federal Motor Vehicle Safety Standard 216a is one regulation directed towards roof crush resistance.

U.S. Pat. No. 6,332,641 B1 discloses a vehicle without B-pillar where the doors are opened outwards, i.e. where the rear door is a so-called suicide door. Reinforcing members are provided near joint surfaces of the front door and the rear door in order to absorb forces from an impact caused by side collision.

SUMMARY

An objective of the disclosure is to provide a door system and a method addressing the issues raised.

The disclosure relates to a door system for a vehicle comprising a vehicle body structure and a first door structure. The vehicle body structure comprises an opening to an interior compartment of the vehicle, wherein the door system comprises a displacement mechanism configured for displacing the first door structure in relation to the opening between an open position and a closed position. The first door structure in the closed position is arranged to cover at least a portion of the opening. The first door structure in the open position is arranged at a distance from the closed position in a longitudinal direction of the vehicle body structure. The first door structure comprises an essentially vertically arranged first door beam arranged to extend between a lower part of the vehicle body structure and an upper part of the vehicle body structure when the first door structure is arranged in a closed position. A first bracket is attached to a lower end of the first door beam by at least one fastening means. The first bracket is arranged to run in a first guide rail arranged in the vehicle body structure. The first guide rail comprises a first recession. The first bracket comprises a first protrusion arranged at a bottom end of the first bracket. Upon a roof crush, the first protrusion and the first recession in the first guide rail is arranged to engage to prevent separation of the first door structure from the vehicle body structure.

The door system according to the disclosure provides a means for a vehicle without a B-pillar to ensure that it meets the safety requirements. The first bracket, arranged to run in a first guide rail arranged in the vehicle body structure, provides stability for the first door structure as the first guide rail ensures that the first door structure can only move in a desired way. Further, by adding a protrusion at a bottom end of the first bracket that is arranged to engage with the first recession in the first guide rail, the door structure can be prevented from either entering the interior compartment or separating from the vehicle by moving in a transverse or Y-direction during a roof crush. This ensures that the vehicle meets the necessary requirements for a roof crush.

The first bracket may comprise a first engaging part arranged at a lower end of the first bracket, and the first guide rail may comprise a correspondingly shaped cross section having an extension in a Y-direction, wherein the first engaging part of the first bracket is arranged to interact with the correspondingly shaped cross section of the first guide rail.

One of the functions of the door system is to ensure that the door structure does not separate from the vehicle body structure to ensure structural integrity during and after the roof crush. By having a bracket comprising a first engaging part and a first guide rail with a correspondingly shaped cross section, the shape of the first bracket and the first guide rail interact to ensure that the first bracket when being guided in the first guide rail during a roof crush is prevented from moving in a vertical direction.

The first bracket may be arranged to be attached to the lower end of the first door beam by a first fastening means arranged at a lower side in an essentially vertical first fastening groove in the first bracket and a second fastening means arranged at a lower side in an essentially vertical second fastening groove in the first bracket, wherein the second fastening groove is arranged above the first fastening groove.

The vertical fastening grooves allow for a slight movement of the fastening means in the bracket during the roof crush.

The displacement mechanism may be configured for slidingly displacing the door structure in relation to the opening between an open position and a closed position.

The vehicle door system according to the disclosure is suitable for many methods for opening doors. One is for vehicles with one sliding door or two sliding doors. The vehicle door system is of course suitable also for other vehicles without B-pillar having e.g. suicide doors.

The door system may further comprise a second door structure. The door system comprises a displacement mechanism configured for displacing the second door structure in relation to the opening between an open position and a closed position, wherein the second door structure in the closed position is arranged to cover at least a portion of the opening. The second door structure in the open position is arranged at a distance from the closed position in a longitudinal direction of the vehicle body structure. The second door structure comprises an essentially vertically arranged second door beam arranged to extend between a lower part of the vehicle body structure and an upper part of the vehicle body structure when the second door structure is arranged in a closed position. A second bracket is arranged to be attached to a lower end of the second door beam by at least one fastening means, wherein the second bracket is arranged to run in a second guide rail in the vehicle body structure comprising a second recession. The second bracket comprises a second protrusion arranged at a bottom end of the second bracket. Upon a roof crush, the second protrusion is arranged to interact with the second recession in the second guide rail in the vehicle body structure to prevent separation of the second door structure from the vehicle body structure.

A vehicle may comprise apart from a first door structure, a second door structure comprising the same parts as the first door structure. The advantage with having a second door structure is that the durability of the vehicle door system is increased, as the vehicle will have two door structures that can disperse the force of a roof crush. Also, having a first door structure and a second door structure that each is arranged to increase the durability of the door system ensures that a vehicle during a roof crush that completely or mostly affects one of the door structures will live up to the requirements of roof crush safety standards. Otherwise, the advantages with the second door structure are the same as described for the first door structure above.

The second bracket may comprise a second engaging part arranged at a lower end of the second bracket, and the second guide rail may comprise a correspondingly shaped cross section having an extension in a Y-direction, wherein the second engaging part of the second bracket is arranged to interact with the correspondingly shaped cross section of the second guide rail.

The advantage is the same as described above for the first bracket.

The second bracket may be arranged to be attached to the lower end of the second door beam by a third fastening means arranged at a lower side in an essentially vertical third fastening groove in the second bracket and a fourth fastening means arranged at a lower side in an essentially vertical fourth fastening groove in the second bracket, wherein the fourth fastening groove is arranged above the third fastening groove.

The advantage is the same as described above for the first bracket.

The displacement mechanism may be configured for slidingly displacing the second door structure in relation to the opening between an open position and a closed position.

The advantage is the same as described above for the first door structure.

The disclosure also relates to a vehicle comprising a door system.

The disclosure also relates to a method for improving durability of a vehicle during a roof crush. The vehicle comprises a door system comprising a vehicle body structure and a first door structure, wherein the vehicle body structure comprises an opening to an interior compartment of the vehicle. The door system comprises a displacement mechanism configured for displacing the first door structure in relation to the opening between an open position and a closed position. The first door structure is in the closed position arranged to cover at least a portion of the opening. The first door structure is in the open position arranged at a distance from the closed position in a longitudinal direction of the vehicle body structure. The method comprises the steps:

providing the first door structure with an essentially vertically arranged first door beam arranged to extend between a lower part of the vehicle body structure and an upper part of the vehicle body structure when the first door structure is arranged in a closed position, providing the first door structure with a first bracket arranged to be attached to a lower end of the first door beam by at least one fastening means, wherein the first bracket is arranged to run in a first guide rail in the vehicle body, wherein the first guide rail comprises a first recession, providing a first protrusion arranged at a bottom end of the first bracket, wherein the first protrusion is arranged to interact with the first recession in the first guide rail in the vehicle body to prevent separation of the first door structure from the vehicle body.

The advantages with the method are the same as for the door system as described above.

The method may further comprise the steps:

providing the first bracket with a first engaging part arranged at a lower end of the first bracket, providing the first guide rail with a correspondingly shaped cross section having an extension in a Y-direction, wherein the first engaging part of the first bracket is arranged to interact with the correspondingly shaped cross section of the first guide rail.

The door system may comprise a second door structure, wherein the door system comprises a displacement mechanism configured for displacing the second door structure in relation to the opening between an open position and a closed position. The second door structure is in the closed position arranged to cover at least a portion of the opening. The second door structure is in the open position arranged at a distance from the closed position in a longitudinal direction of the vehicle body structure. The method may further comprise the steps:

providing the second door structure with an essentially vertically arranged second door beam arranged to extend between a lower part of the vehicle body structure and an upper part of the vehicle body structure when the second door structure is arranged in a closed position, providing the second door structure with a second bracket arranged to be attached to a lower end of the second door beam by at least one fastening means, wherein the second bracket is arranged to run in a second guide rail in the vehicle body, wherein the second guide rail comprises a second recession, providing a second protrusion arranged at a bottom end of the second bracket, wherein the second protrusion is arranged to interact with the second recession in the second guide rail in the vehicle body to prevent separation of the second door structure from the vehicle body.

The method may further comprise the steps:

providing the second bracket with a second engaging part arranged at a lower end of the second bracket, providing the second guide rail with a correspondingly shaped cross section having an extension in a Y-direction, wherein the second engaging part of the second bracket is arranged to interact with the correspondingly shaped cross section of the second guide rail.

DETAILED DESCRIPTION

Figure 1:
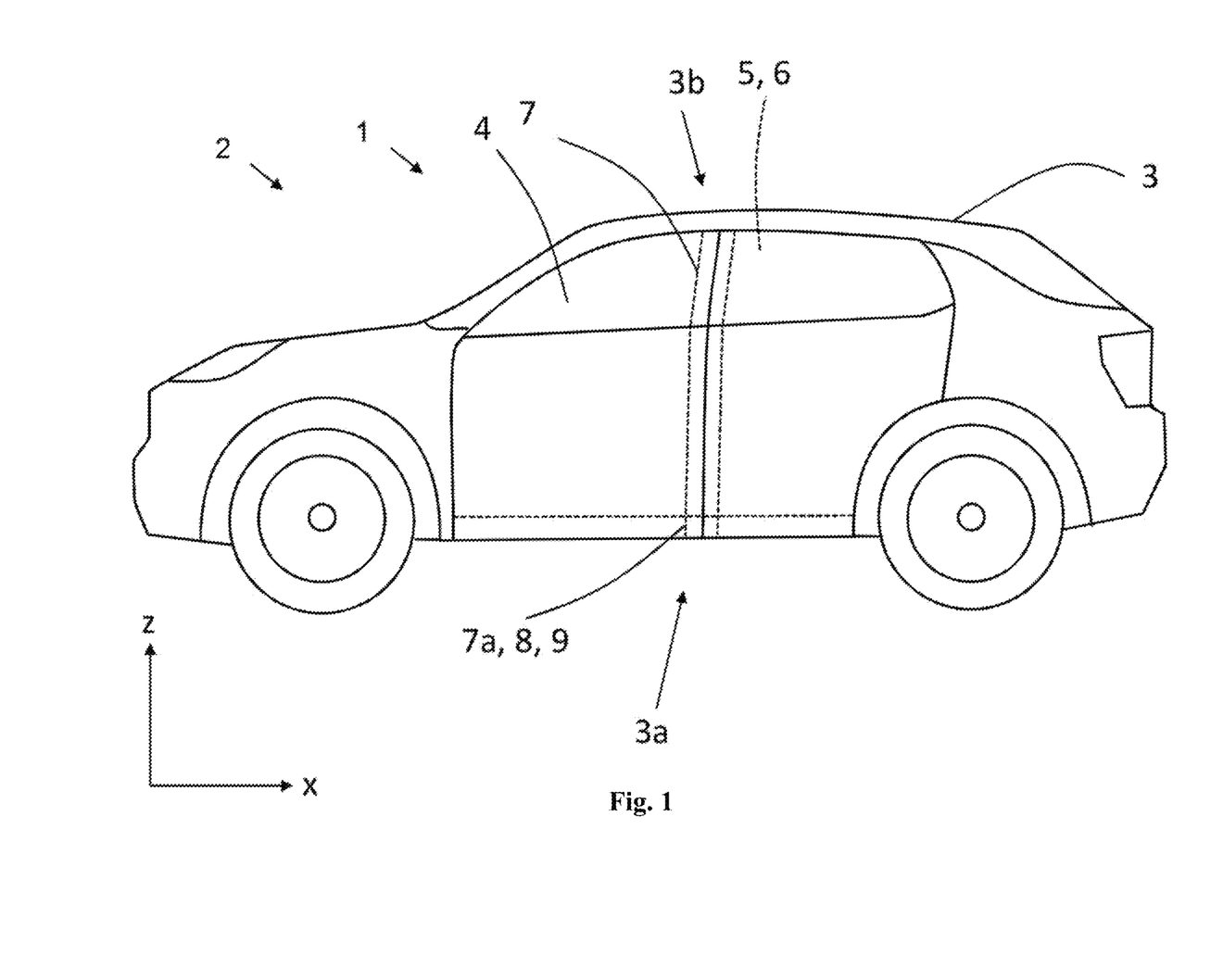
FIG. 1 schematically shows a vehicle comprising a door system according to the disclosure, FIG. 2 schematically shows a cross sectional view of a first door structure of the door system according to the disclosure, FIG. 3 schematically shows a cross sectional view of a door structure of the door system according to the disclosure during a roof crush, FIG. 4 schematically shows a cross sectional view of a door structure of the door system according to the disclosure in the late stage of a roof crush, FIG. 5 schematically shows a cross sectional view of the first bracket and the correspondingly shaped first guide rail, FIG. 6 schematically shows a vehicle comprising a door system according to a further embodiment of the disclosure, FIG. 7 schematically shows a cross sectional view of a second door structure of the door system according to the disclosure.

FIG. 1 schematically shows a vehicle 1 comprising a door system 2 according to the disclosure. The vehicle 1 has a length extension in a longitudinal or x-direction, a width extension in a lateral, transverse or y-direction and a height extension in a vertical or z-direction.

The door system 2 comprises a vehicle body structure 3 and a first door structure 4. The vehicle body structure 3 comprises an opening 5 to an interior compartment 6 of the vehicle 1. The door system 2 comprises a displacement mechanism (not shown) configured for displacing the first door structure 4 in relation to the opening 5 between an open position and a closed position. The first door structure 4 is in the closed position arranged to cover at least a portion of the opening 5. The first door structure 4 is in the open position arranged at a distance from the closed position in the longitudinal direction of the vehicle body structure 3. The first door structure 4 comprises a first door beam 7 arranged to extend between a lower part 3a of the vehicle body structure 3 and an upper part 3b of the vehicle body structure 3 when the first door structure 4 is arranged in a closed position.

Schematically shown in FIG. 1, a first bracket 8 is attached to a lower end 7a of the first door beam 7. The first bracket 8 is arranged to run in a first guide rail 9 arranged in the vehicle body structure 3.

Figure 2:
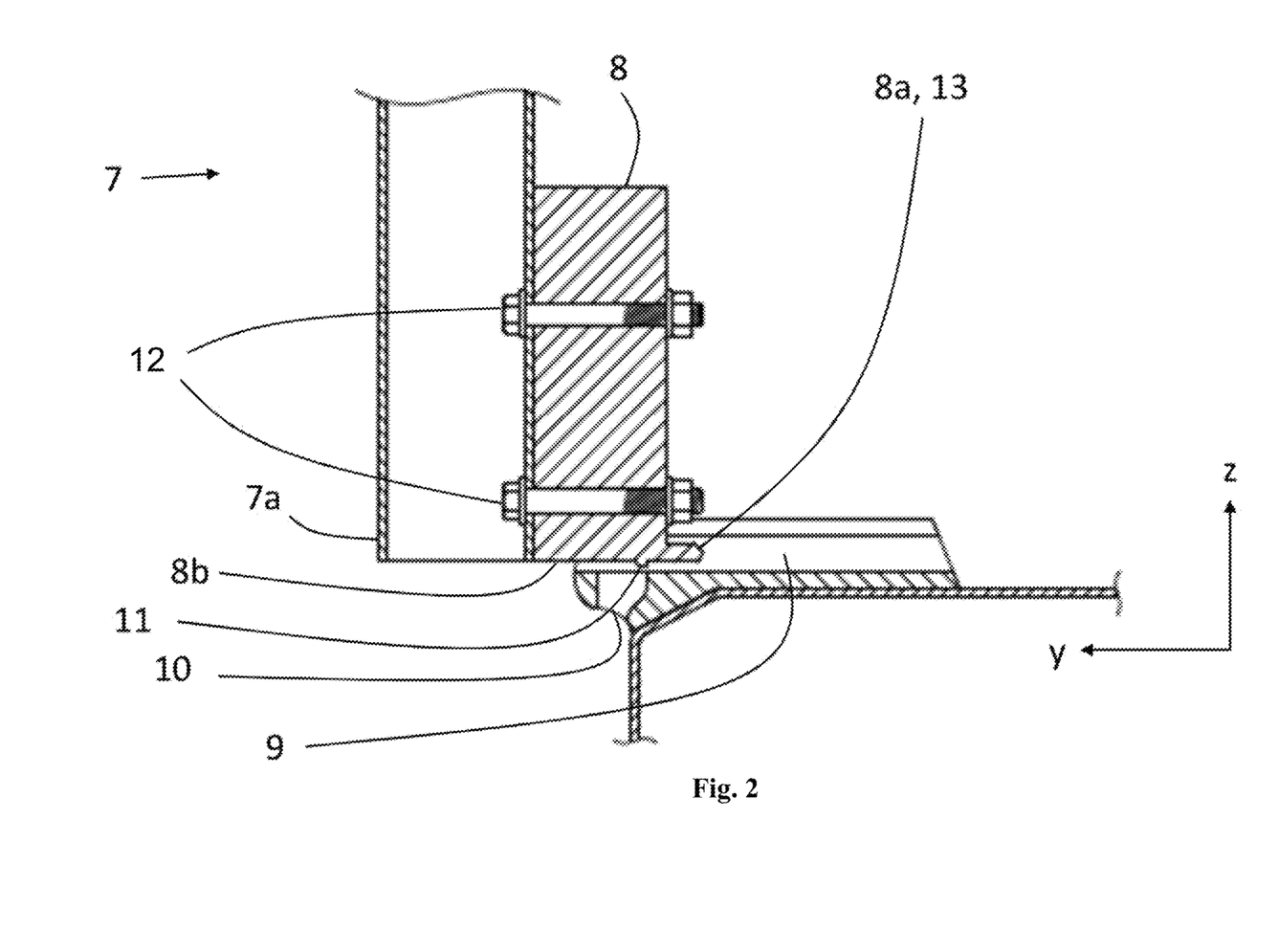

FIG. 2 schematically shows a cross sectional view of the first door structure 4 of the door system 2 according to the disclosure. In this example, the view is a close up view of the first door structure 4 of a vehicle 1 as seen from the rear of the vehicle 1 looking towards the front, as it is a left side door. For a right side door, the features will be mirrored with possible changes in designs depending on if the door is a driver door and a passenger door or if the door is a rear door or a front door.

The first door structure 4 comprises the first door beam 7 and a first bracket 8 attached to the first door beam 7. The exterior parts of the door have been removed for clarity. As can be seen, the first guide rail 9 comprises a first recession 10. The first bracket 8 comprises a first protrusion 11 arranged at a bottom end 8a of the first bracket 8. Upon a roof crush, the first protrusion 11 and the first recession 10 in the first guide rail 9 is arranged to engage to prevent separation of the first door structure 4 from the vehicle body structure 3.

In this example, the first protrusion 11 is arranged on the first bracket 8 and the first bracket 8 is attached to a lower end 7a of the first door beam 7 by means of first attachment means 12. The number of first attachment means 12, may be more than two as shown in the figure or only one, depending on the design.

In FIG. 2, the first door structure 4 is in the closed position and the first bracket 8 is running in the first guide rail 9 arranged in the vehicle body structure 3. The first guide rail 9 has an extension essentially along the y-direction or in the lateral direction of the vehicle body structure 3. Minor deviations from the y-directions can be allowed without loss of function.

The first bracket 8 comprises a first engaging part 13 arranged at a first bracket lower end 8b. The first guide rail 9 comprises a correspondingly shaped cross section having an extension in a Y-direction. The first engaging part 13 of the first bracket 8 is arranged to interact with the correspondingly shaped cross section of the first guide rail 9.

The first engaging part 13 may e.g. comprise an essentially T-shaped part, or an essentially spherically shaped part arranged at a first bracket lower end 8b. The first guide rail 9 may have an essentially correspondingly shaped receiving cross section. It is of course possible for further alternative shapes for the cross sections of the first engaging part 13 and the first guide rail 9 to fulfill the desired function.

Figure 3:
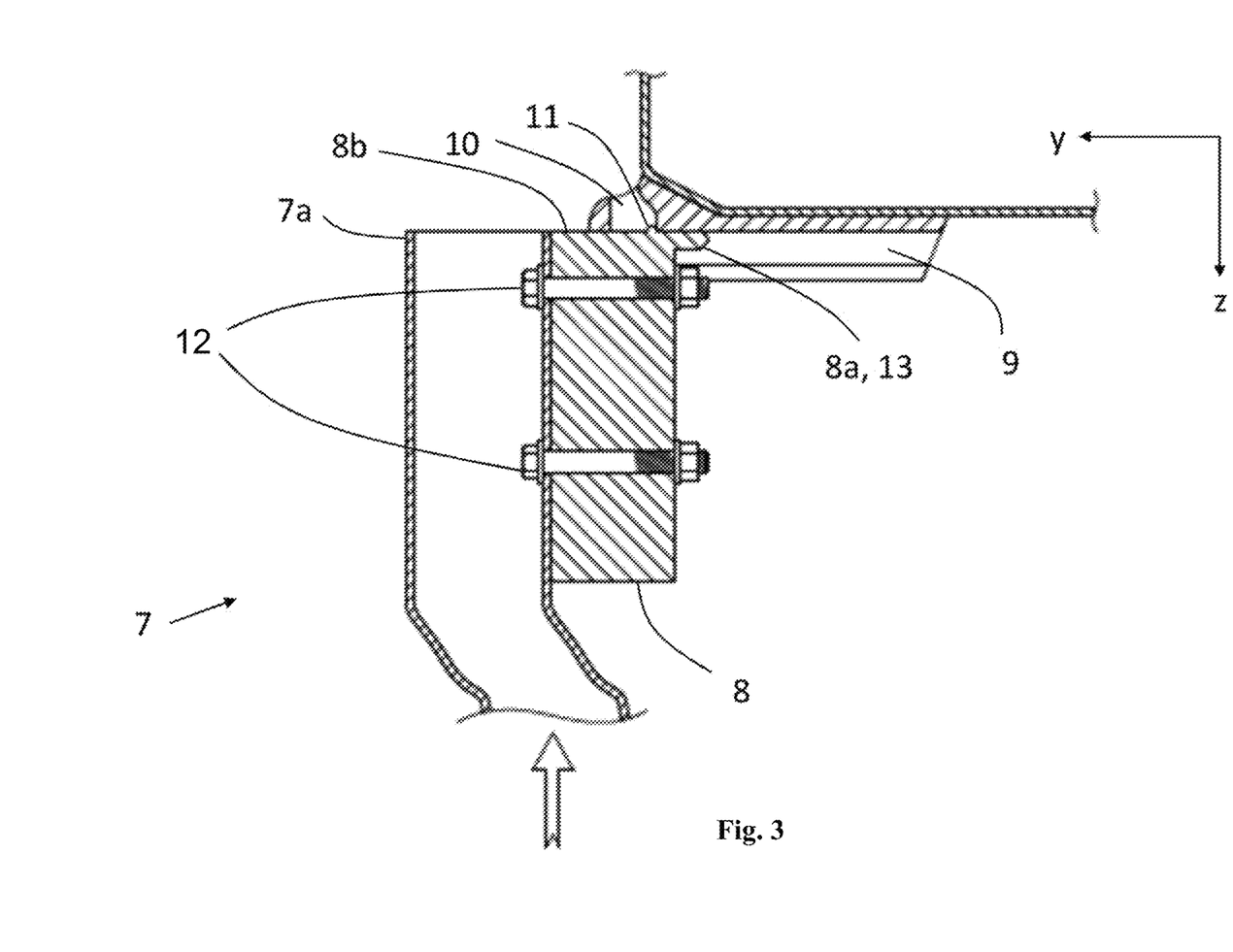

FIG. 3 schematically shows a cross sectional view of a door structure of the door system 2 according to the disclosure during a roof crush. In figure, the vehicle 1 is now lying on its roof as indicated by that the first door structure 4 is upside down relative FIG. 2. The coordinate system has also been inverted such that the reference system is the same as the reference system in FIG. 2. An arrow indicating an impact force acting downwards, i.e. acting in a negative z-direction, illustrates the roof crush, as the vehicle 1 is now lying on its roof. As can be seen in the figure, the first door beam 7 has started to buckle and the first bracket 8, being attached to the first door beam 7, has thereby moved downwards in the first guide rail 9. In the figure, the first protrusion 11 on the first bracket 8 has thereby engaged with the first recession 10 in the first guide rail 9.

Figure 4:
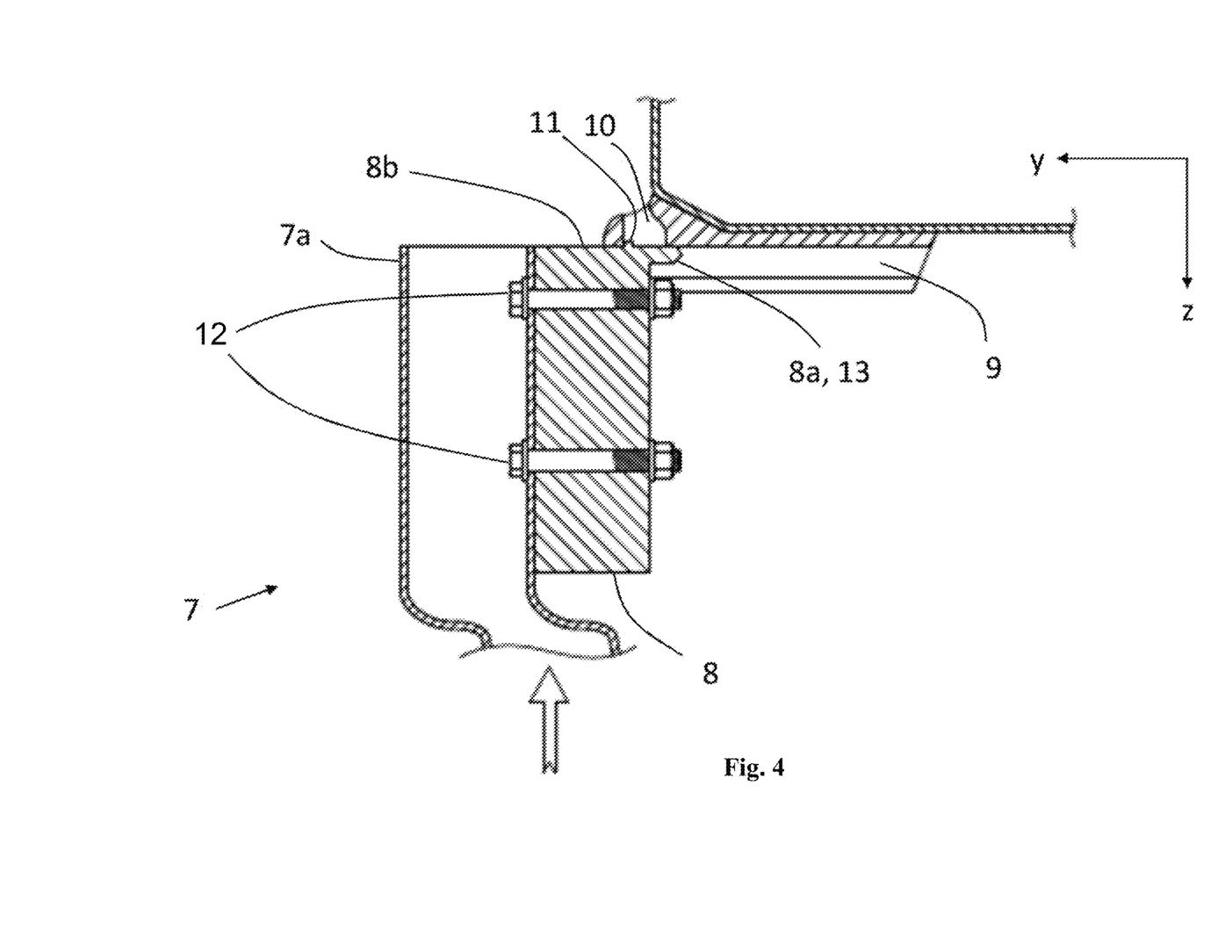

FIG. 4 schematically shows a cross sectional view of a door structure of the door system 2 according to the disclosure in the late stage of a roof crush. In the figure, the first door structure 4 has been pushed outwards in the y-direction. The first protrusion 11 on the first bracket 8 engaging with the first recession 10 in the first guide rail 9 prevents the first door structure 4 from separating from the vehicle 1 and thereby keeps the structural integrity during the roof crush.

Figure 5:
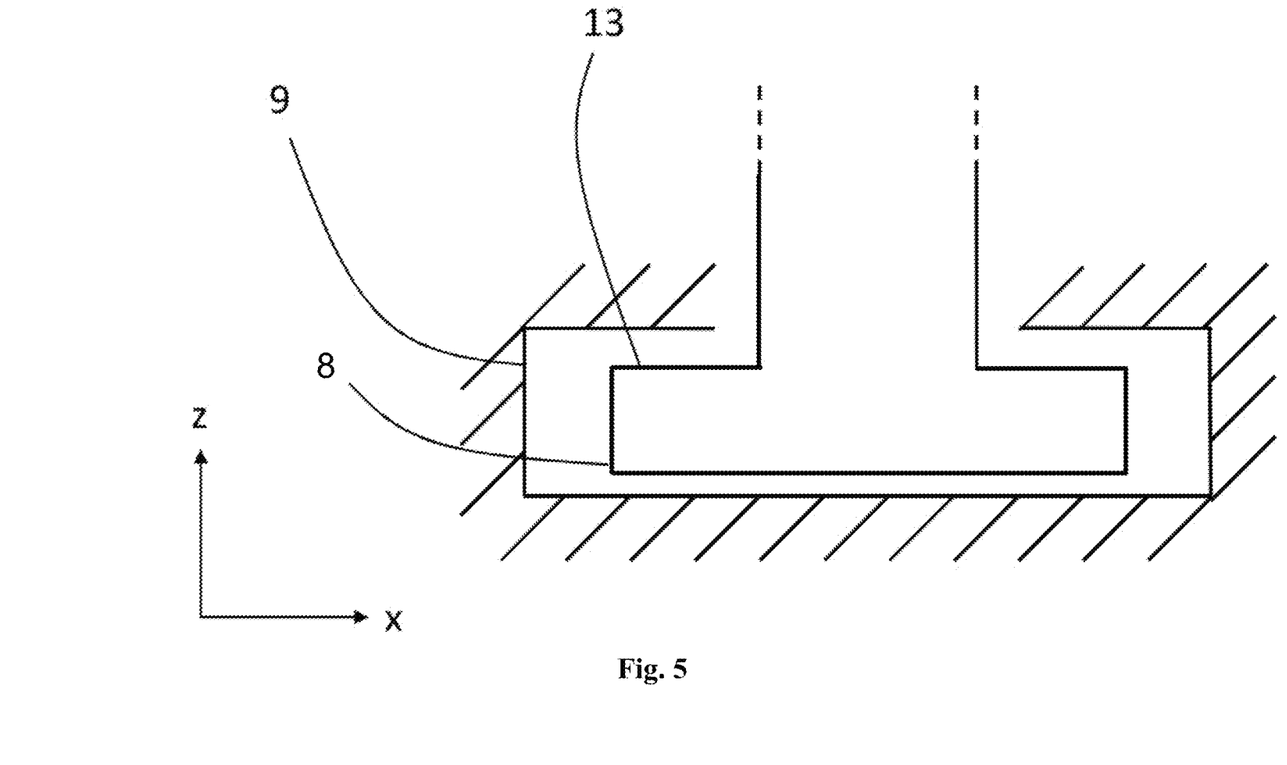

FIG. 5 schematically shows a cross sectional view of the first bracket 8 and the correspondingly shaped first guide rail 9. As can be seen from the figure, the design of the first guide rail 9 and the first bracket 8 prevents the first bracket 8 from moving in a vertical direction, i.e. in the z-direction. Additionally, the first bracket 8 is further prevented from moving in a longitudinal direction, i.e. in the x-direction. The first guide rail 9 thus limits movement along the x-, y- and z-axes as described and thereby prevents the first door structure 4 from separating during a roof crush if the vehicle 1 is rolling.

Figure 6:
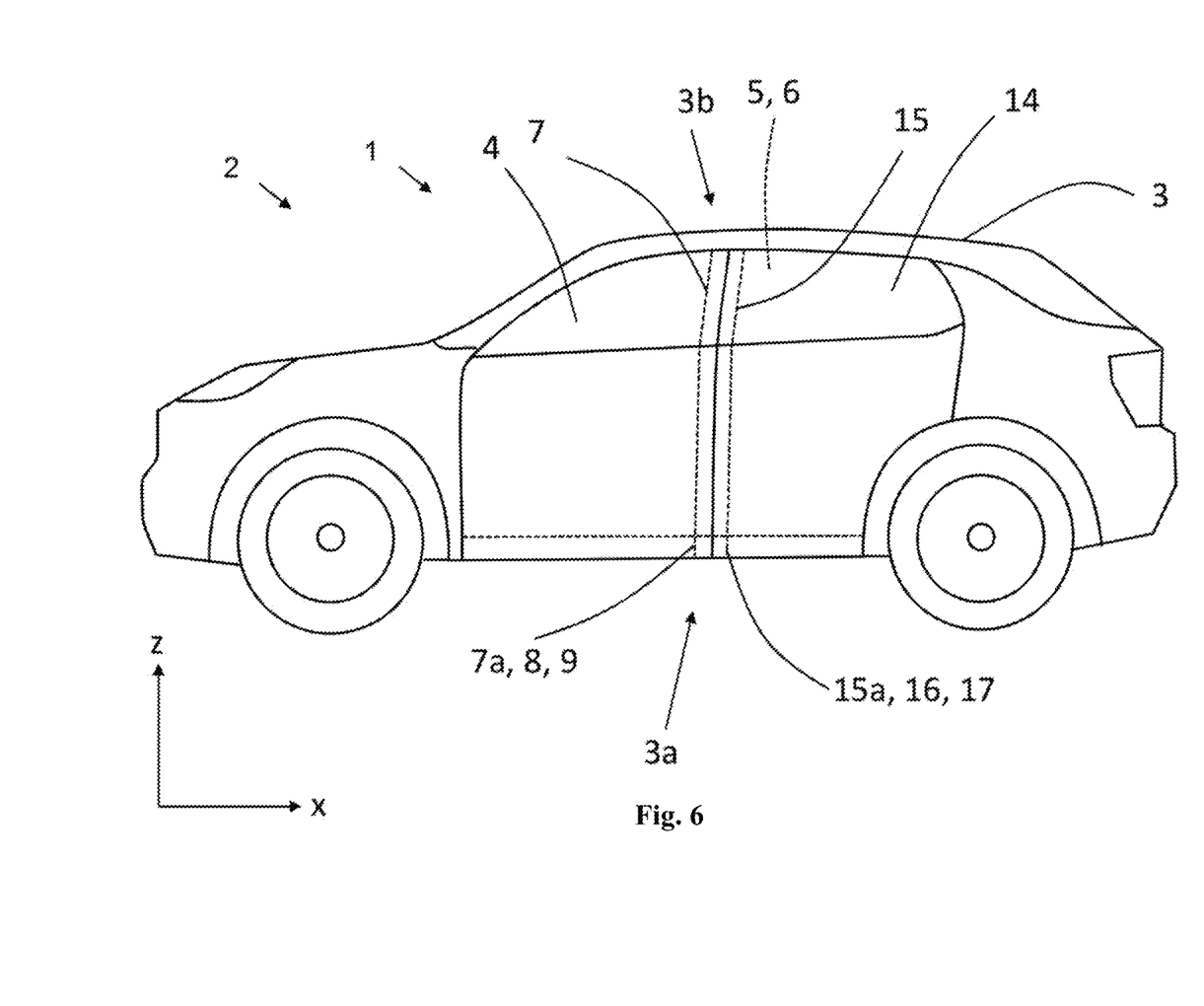

FIG. 6 schematically shows a vehicle 1 comprising a door system 2 according to a further embodiment of the disclosure. The door system 2 further comprises a second door structure 14 similar to the first door structure 4. The door system 2 comprises a displacement mechanism (not shown) configured for displacing the second door structure 14 in relation to the opening 5 between an open position and a closed position. The second door structure 14 is in the closed position arranged to cover at least a portion of the opening 5. The second door structure 14 is in the open position arranged at a distance from the closed position in a longitudinal direction of the vehicle body structure 3. The second door structure 14 comprises an essentially vertically arranged second door beam 15 arranged to extend between a lower part 3a of the vehicle body structure 3 and an upper part 3b of the vehicle body structure 3 when the second door structure 14 is arranged in a closed position. A second bracket 16 is arranged to be attached to a lower end 15a of the second door beam 15. The second bracket 16 is arranged to run in a second guide rail 17 in the vehicle body structure 3 comprising a second recession 18. The second bracket 16 comprises a second protrusion 19 arranged at a bottom end 16a of the second bracket 16. Upon a roof crush, the second protrusion 19 is arranged to interact with the second recession 18 in the second guide rail 17 in the vehicle body structure 3 to prevent separation of the second door structure 14 from the vehicle body structure 3.

Figure 7:
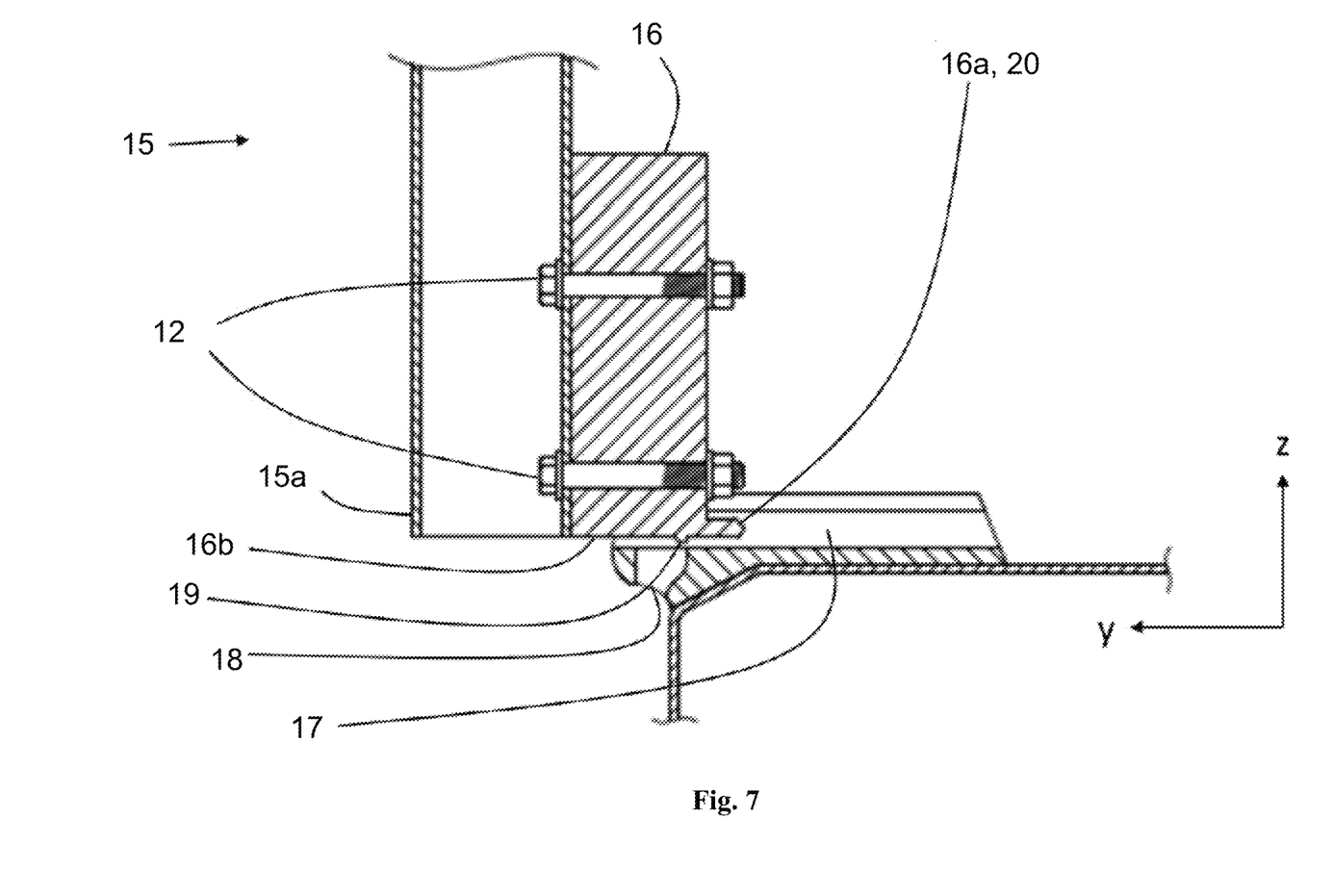

Although not shown in detail, the second door structure 14 may similar to the first door structure 4 comprise a second bracket 16 comprises a second engaging part 20 arranged at a second bracket lower end 16b. The second guide rail 17 comprises a correspondingly shaped cross section having an extension in a Y-direction, wherein the second engaging part of the second bracket 16 is arranged to interact with the correspondingly shaped cross section of the second guide rail 17. The second bracket 16 may be attached to the second door beam 15 in the same way as the first bracket 8 is attached to the first door beam 7.

The second engaging part 20 may e.g. comprise an essentially T-shaped part, or a spherically shaped part arranged at a second bracket lower end 16b. The second guide rail 17 may have an essentially correspondingly shaped receiving cross section. It is of course possible for further alternative shapes for the cross sections of the second engaging part and the second guide rail 17 to fulfill the desired function.

Although the disclosure has been illustrated and described in detail in the drawings and foregoing description, such illustration and description are to be considered illustrative or exemplary and the disclosure is not limited to the disclosed example embodiments.

REFERENCES

1. Vehicle
2. Door System
3. Vehicle body structure
    a. Lower part
    b. Upper part
4. First door structure
5. Opening
6. Interior compartment
7. First door beam
    a. Lower end
8. First bracket
    a. Bottom end
    b. Lower end
9. First guide rail
10. First recession
11. First protrusion
12. First attachment means
13. First engaging part
14. Second door structure
15. Second door beam
    a. Lower end
16. Second bracket
    a. Bottom end
    b. Lower end
17. Second guide rail
18. Second recession,
19. Second protrusion
20. Second engaging part

What is claimed is:

1. A door system for a vehicle comprising a vehicle body structure and a first door structure, wherein the vehicle body structure comprises an opening to an interior compartment of the vehicle, wherein the first door structure is configured to displace between an open position and a closed position in relation to the opening, wherein the first door structure in the closed position is arranged to cover at least a portion of the opening, and wherein the first door structure in the open position is arranged at a distance from the closed position in a longitudinal direction of the vehicle body structure, wherein the first door structure comprises an essentially vertically arranged first door beam arranged to extend between a lower part of the vehicle body structure and an upper part of the vehicle body structure when the first door structure is arranged in a closed position, wherein a first bracket is attached to a lower end of the first door beam by at least one fastening means, wherein the first bracket is arranged to run in a first guide rail arranged in the vehicle body structure and extending essentially along a lateral direction of the vehicle body structure, wherein the first guide rail comprises a first recession, wherein the first bracket comprises a first protrusion arranged at a bottom end of the first bracket and wherein the first bracket comprises a first engaging part arranged at a first bracket lower end, and the first guide rail comprises an correspondingly shaped cross section having an extension in the lateral direction, wherein the first engaging part of the first bracket is arranged to interact with the correspondingly shaped cross section of the first guide rail, wherein, upon a roof crush, the first protrusion and the first recession in the first guide rail is arranged to engage to prevent separation of the first door structure from the vehicle body structure.

2. Door system according to claim 1, wherein the first bracket is arranged to be attached to the lower end of the first door beam by a first fastening means arranged at a lower side in an essentially vertical first fastening groove in the first bracket and a second fastening means arranged at a lower side in an essentially vertical second fastening groove in the first bracket, wherein the second fastening groove is arranged above the first fastening groove.

3. Door system according to claim 1, wherein the first door structure is configured to slidingly displace between the open position and the closed position.

4. Door system according to claim 1, wherein the first engaging part may be essentially T-shaped and the first guide rail may have an essentially correspondingly shaped receiving cross section.

5. Door system according to claim 1, wherein the door system comprises a second door structure configured to displace between an open position and a closed position in relation to the opening, wherein the second door structure in the closed position is arranged to cover at least a portion of the opening, and wherein the second door structure in the open position is arranged at a distance from the closed position in a longitudinal direction of the vehicle body structure, wherein the second door structure comprises an essentially vertically arranged second door beam arranged to extend between a lower part of the vehicle body structure and an upper part of the vehicle body structure when the second door structure is arranged in a closed position, wherein a second bracket is arranged to be attached to a lower end of the second door beam by at least one fastening means, wherein the second bracket is arranged to run in a second guide rail in the vehicle body structure comprising a second recession, wherein the second bracket comprises a second protrusion arranged at a bottom end of the second bracket, wherein, upon a roof crush, the second protrusion is arranged to interact with the second recession in the second guide rail in the vehicle body structure to prevent separation of the second door structure from the vehicle body structure.

6. Door system according to claim 5, wherein the second bracket comprises a second engaging part arranged at a second bracket lower end, and the second guide rail comprises a correspondingly shaped cross section having an extension in the lateral direction, wherein the second engaging part of the second bracket is arranged to interact with the correspondingly shaped cross section of the second guide rail.

7. Door system according to claim 5, wherein the second bracket is arranged to be attached to the lower end of the second door beam by a third fastening means arranged at a lower side in an essentially vertical third fastening groove in the second bracket and a fourth fastening means arranged at a lower side in an essentially vertical fourth fastening groove in the second bracket, wherein the fourth fastening groove is arranged above the third fastening groove.

8. Door system according to claim 5, wherein the second door structure is configured to slidingly displace between the open position and the closed position.

9. Door system according to claim 6, wherein the second engaging part may be essentially T-shaped and the second guide rail may have an essentially correspondingly shaped receiving cross section.

10. Vehicle comprising a door system according to claim 1.

11. Method for improving durability of a vehicle during a roof crush, the vehicle comprising a door system comprising a vehicle body structure and a first door structure, wherein the vehicle body structure comprises an opening to an interior compartment of the vehicle, wherein the first door structure is configured to displace between an open position and a closed position in relation to the opening, wherein the first door structure in the closed position is arranged to cover at least a portion of the opening, and wherein the first door structure in the open position is arranged at a distance from the closed position in a longitudinal direction of the vehicle body structure, wherein the method comprises the steps:
providing the first door structure with an essentially vertically arranged first door beam arranged to extend between a lower part of the vehicle body structure and an upper part of the vehicle body structure when the first door structure is arranged in a closed position,
providing the first door structure with a first bracket arranged to be attached to a lower end of the first door beam by at least one fastening means, wherein the first bracket is arranged to run in a first guide rail in the vehicle body, wherein the first guide rail comprises a first recession,
providing a first protrusion arranged at a bottom end of the first bracket,
providing the first bracket with a first engaging part arranged at a first bracket lower end,
providing the first guide rail with a correspondingly shaped cross section having an extension in a lateral direction, wherein the first engaging part of the first bracket is arranged to interact with the correspondingly shaped cross section of the first guide rail,
wherein the first protrusion is arranged to interact with the first recession in the first guide rail in the vehicle body to prevent separation of the first door structure from the vehicle body.

12. Method according to claim 11, wherein the door system comprises a second door structure, the second door structure is configured to displace between an open position and a closed position in relation to the opening, wherein the second door structure in the closed position is arranged to cover at least a portion of the opening, and wherein the second door structure in the open position is arranged at a distance from the closed position in a longitudinal direction of the vehicle body structure, wherein the method comprises the steps:
providing the second door structure with an essentially vertically arranged second door beam arranged to extend between a lower part of the vehicle body structure and an upper part of the vehicle body structure when the second door structure is arranged in a closed position,
providing the second door structure with a second bracket arranged to be attached to a lower end of the second door beam by at least one fastening means, wherein the second bracket is arranged to run in a second guide rail in the vehicle body, wherein the second guide rail comprises a second recession,
providing a second protrusion arranged at a bottom end of the second bracket, wherein the second protrusion is arranged to interact with the second recession in the second guide rail in the vehicle body to prevent separation of the second door structure from the vehicle body.

13. Method according to claim 12, wherein the method comprises the steps:
providing the second bracket with a second engaging part arranged at a second bracket lower end,
providing the second guide rail with a correspondingly shaped cross section having an extension in the lateral direction, wherein the second engaging part of the second bracket is arranged to interact with the correspondingly shaped cross section of the second guide rail.

* * * * *